(12) United States Patent
Horiuchi

(10) Patent No.: US 8,072,708 B2
(45) Date of Patent: Dec. 6, 2011

(54) HEAD SUSPENSION, LOAD BEAM, AND METHOD OF MANUFACTURING LOAD BEAM

(75) Inventor: Takashi Horiuchi, Aikoh-gun (JP)

(73) Assignee: NHK Spring Co., Ltd, Kanagawa (JP)

( * ) Notice: Subject to any disclaimer, the term of this patent is extended or adjusted under 35 U.S.C. 154(b) by 571 days.

(21) Appl. No.: 12/284,400

(22) Filed: Sep. 22, 2008

(65) Prior Publication Data

US 2009/0097162 A1  Apr. 16, 2009

(30) Foreign Application Priority Data

Oct. 11, 2007 (JP) ................................. 2007-265481

(51) Int. Cl.
  *G11B 21/21* (2006.01)
(52) U.S. Cl. .................................................... 360/245.1
(58) Field of Classification Search .................. None
  See application file for complete search history.

(56) References Cited

U.S. PATENT DOCUMENTS

| | | | | |
|---|---|---|---|---|
| 4,964,941 A | * | 10/1990 | Von Brandt et al. | 156/360 |
| 6,212,760 B1 | * | 4/2001 | Summers et al. | 29/603.06 |
| 6,662,069 B1 | * | 12/2003 | Khlif | 700/117 |
| 7,275,302 B2 | * | 10/2007 | Ng | 29/603.03 |
| 7,287,315 B2 | * | 10/2007 | Hayami et al. | 29/729 |
| 7,441,323 B1 | * | 10/2008 | Wolter | 29/603.06 |
| 7,688,552 B2 | * | 3/2010 | Yao et al. | 360/245.1 |
| 2005/0094542 A1 | | 5/2005 | Hayami et al. | |
| 2007/0008652 A1 | * | 1/2007 | Yang et al. | 360/245.3 |
| 2008/0037174 A1 | * | 2/2008 | Yao et al. | 360/245.4 |
| 2010/0139084 A1 | * | 6/2010 | Mizuishi | 29/603.07 |

FOREIGN PATENT DOCUMENTS

| | | |
|---|---|---|
| JP | 7-009364 | 1/1995 |
| JP | 7-296535 | 11/1995 |
| JP | 8-161843 | 6/1996 |
| JP | 10-199164 | 7/1998 |
| JP | 2004-86984 | 3/2004 |
| JP | 2005-134174 | 5/2005 |
| JP | 2005-135467 | 5/2005 |
| JP | 2006-308425 | 11/2006 |

* cited by examiner

*Primary Examiner* — Mark Blouin
(74) *Attorney, Agent, or Firm* — Jordan and Hamburg LLP

(57) ABSTRACT

A load beam is capable of securing a required level of positioning accuracy for a slider, a load beam has a body and a dimple, the body is made of a plate having a first surface and a second surface, the dimple has a convex curved surface protruding from the first surface of the body and supports a slider so that the slider is movable in predetermined directions to write and read information to and from a disk in a disk drive, and the load beam includes a mark formed on the second surface of the body, configured to provide positional information about a vertex of the dimple.

6 Claims, 10 Drawing Sheets

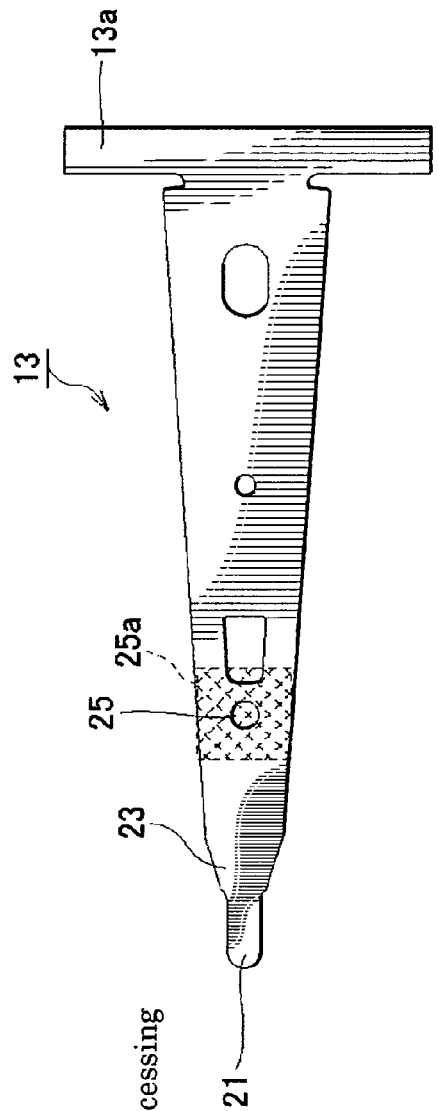
Fig.2(1) Before processing
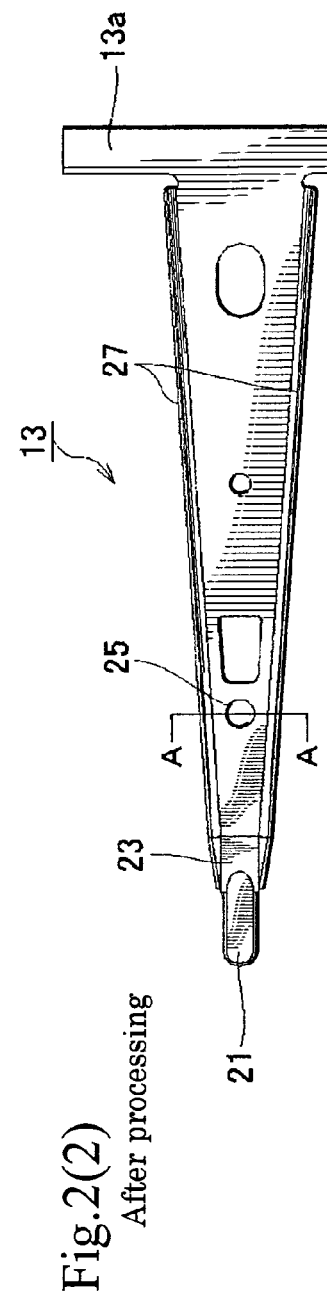
Fig.2(2) After processing
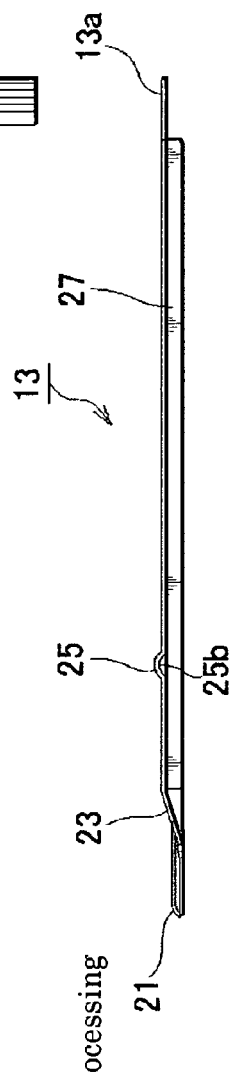
Fig.2(3) After processing Fig.3(1) Before processing
Fig.3(2) Just after processing
Fig.3(3) Sectional view of product
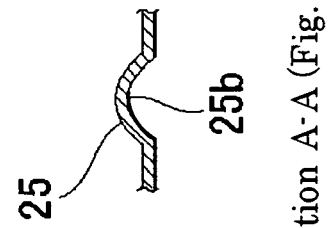
Section A-A (Fig. 2(2))

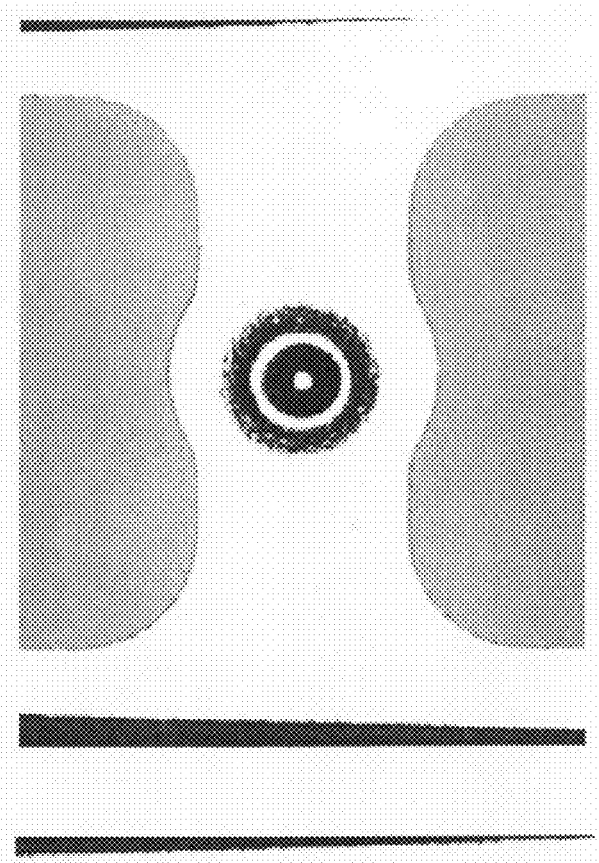
Fig.4(2) Embodiment
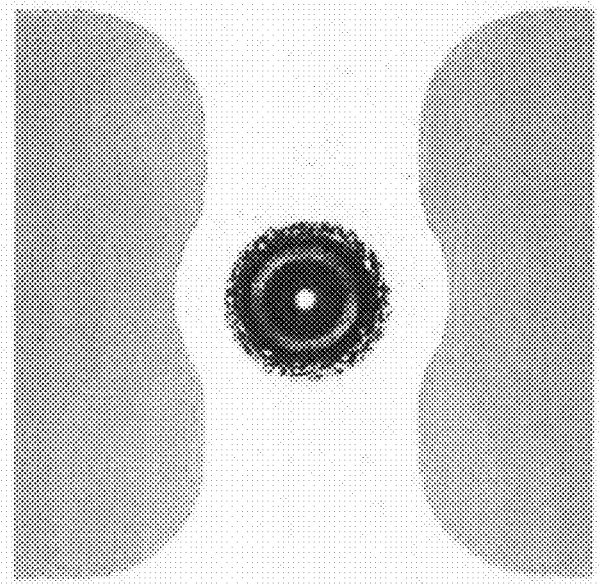
Fig.4(1) Comparative example

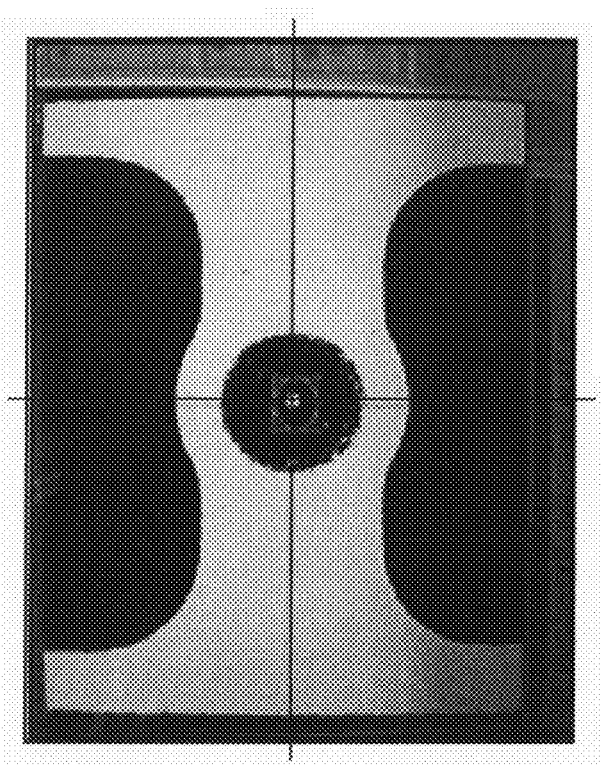
Fig.5(2) Origin extraction
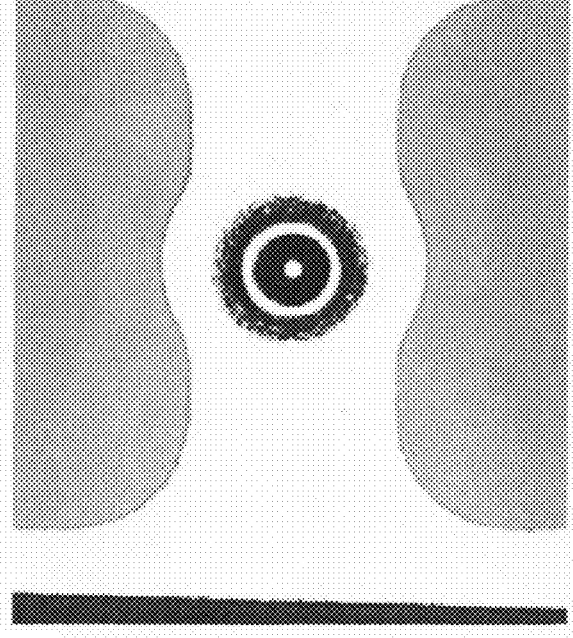
Fig.5(1) Concave curved surface

Before drawing

After drawing

US 8,072,708 B2

HEAD SUSPENSION, LOAD BEAM, AND METHOD OF MANUFACTURING LOAD BEAM

BACKGROUND OF THE INVENTION

1. Field of the Invention

The present invention relates to a head suspension for supporting a slider in a disk drive such as an external storage device of a computer, a load beam which is a part of the head suspension, and a method of manufacturing the load beam.

2. Description of Related Art

Disk drives such as magnetic disk drives and optical disk drives are widely used as storage devices of computers. Among the disk drives, a magnetic disk drive or a hard disk drive (HDD) has a head suspension for supporting a magnetic head slider (hereinafter simply referred to as "slider").

The head suspension includes a base plate, a load beam, a flexure attached to the load beam, and the like. The load beam supports a gimbal which is a plate spring. A front end of the gimbal forms a tongue serving as a slider mount. To the tongue, a slider is attached with, for example, an adhesive. The slider is slightly pushed with spring force toward the surface of a magnetic disk arranged in the magnetic disk drive.

The periphery of the tongue at the front end of the gimbal is mostly cut from the body of the gimbal. The slider on the gimbal is supported with a dimple formed at a front end of the load beam. The dimple has a convex curved surface to support the slider with the tongue of the gimbal interposing between the dimple and the slider that is adhered to the tongue. A barycenter of the slider is adjusted to the dimple.

When the magnetic disk is rotated, a fluid dynamic pressure effect occurs to slightly float the slider from the surface of the magnetic disk against load applied to the slider by the load beam. At this time, the dimple functions as a fulcrum to freely change the attitude of the slider in tangential and normal directions with respect to a track of the magnetic disk.

The slider opposes the dimple with the tongue interposing between them. To properly control the attitude of the slider, it is very important to position the barycenter of the slider just on a vertex of the dimple, as explained in Japanese Unexamined Patent Application Publication No. 2004-86984.

It is very difficult, however, to adjust the barycenter of the slider to a vertex of the dimple.

SUMMARY OF THE INVENTION

An object of the present invention is to provide a technique of positioning the barycenter of a slider just on the vertex of a dimple.

In order to accomplish the object, a first aspect of the present invention provides a load beam having a body and a dimple, the body being made of a plate having a first surface and a second surface, the dimple having a convex curved surface protruding from the first surface of the body and supporting a slider so that the slider is movable in predetermined directions to write and read information to and from a disk in a disk drive. The load beam includes a mark formed on the second surface of the body, configured to provide positional information about a vertex of the dimple.

The first aspect enables positional information about the vertex of the dimple to be easily and accurately obtained from the second surface side of the load beam, so that the slider is precisely positioned onto the dimple according to the positional information.

A second aspect of the present invention provides a head suspension having the load beam of the first aspect. With the slider precisely positioned on the dimple, the head suspension of the second aspect can properly control the attitude of the slider.

A third aspect of the present invention provides a method of manufacturing the load beam of the first aspect. The method includes obtaining the positional information about the vertex of the dimple and forming the mark on the second surface of the body of the load beam, so that the mark provides the positional information about the vertex.

The third aspect easily and surely manufactures the load beam provided with the mark.

A fourth aspect of the present invention forms the mark with a laser beam.

The fourth aspect employs a laser beam to easily and surely form the mark on the second surface of the load beam.

BRIEF DESCRIPTION OF THE DRAWINGS

FIG. 2(1) is a front view showing a load beam in a half-finished state according to an embodiment of the present invention;

FIGS. 2(2) and 2(3) are front and side views showing the load beam of FIG. 2(1) in a finished state;

FIGS. 3(1), 3(2), and 3(3) are views showing a process of forming a dimple with a metal mold;

FIG. 4(1) is an image showing a concave curved surface of a dimple formed without laser irradiation according to a comparative example;

FIG. 4(2) is an image showing a concave curved surface of a dimple made by laser irradiation (fixed focus) and pressing according to an embodiment of the present invention;

FIG. 5(1) is an image showing a concave curved surface of a dimple from which positional information is obtained according to an embodiment of the present invention;

FIG. 5(2) is an image showing a bottom point extracted from the image of FIG. 5(1);

DETAILED DESCRIPTION OF EMBODIMENTS

A head suspension, a load beam, and a method of manufacturing a load beam according to embodiments of the present invention will be explained in detail with reference to the drawings. In the following explanation, a "work" implicates any material to be processed, including a semifinished or half-finished product.

First, a head suspension having a load beam according to an embodiment of the present invention will be explained.

Figure 1:
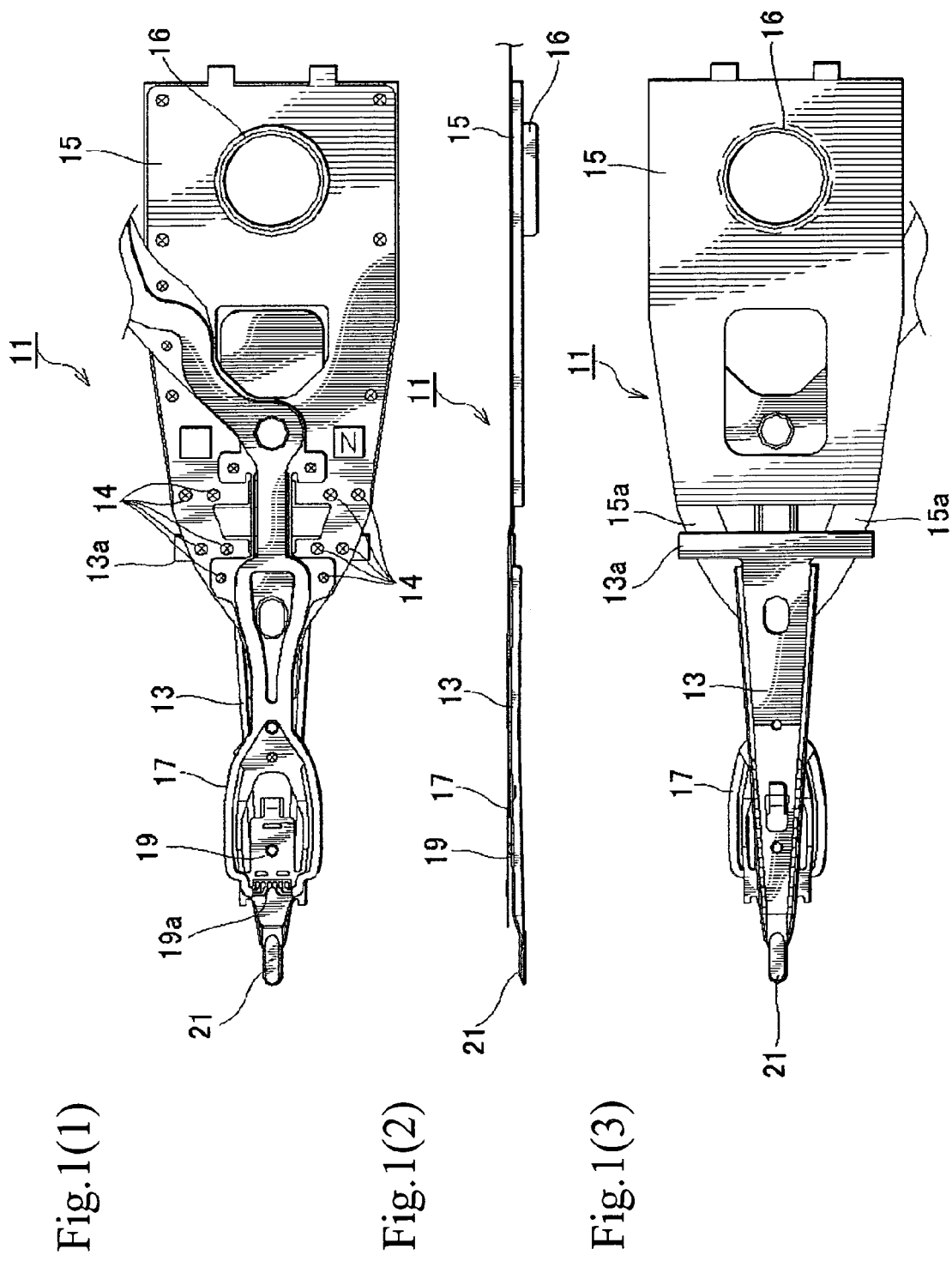
FIGS. 1(1), 1(2), and 1(3) are front, side, and back views showing a head suspension according to an embodiment of the present invention.

FIGS. 1(1), 1(2), and 1(3) are plan, side, and back views showing the head suspension according to an embodiment of the present invention.

The head suspension 11 has a load beam 13, a base plate 15, a flexure 17, and other elements.

The load beam 13 is produced according to a manufacturing method explained later. The load beam 13 is made of a precision thin plate spring and functions to apply load onto a slider (explained later). Material for the load beam 13 is preferably a metal plate made of austenite-based stainless steel such as SUS304 and SUS305 (Japanese Industrial Standard). For example, the SUS304 contains 0.08% or lower C, 1% or lower Si, 2% or lower Mn, 0.04% or lower P, 0.03% or lower S, 8% to 10.5% Ni, 18% to 20% Cr, and the rest Fe. The thickness of the load beam 13 is in the range of several tens of micrometers to about 100 μm.

The load beam 13 has a base 13a that is fixed to the base plate 15 by, for example, laser welding at welding spots 14. The base plate 15 has a pair of springs 15a (FIG. 1(3)) made of a resilient thin stainless steel rolled plate. The springs 15a support the load beam 13. The base plate 15 has a boss 16, which is attached to a carriage arm (not shown) to pivot the base plate 15 around an axis. The base plate 15 may be integral with an arm to be attached to a carriage. When the base plate 15 is pivoted, the head suspension 11 moves in a transverse direction of a disk arranged in a hard disk drive in which the head suspension 11 is installed, to position the slider onto a target track of the disk.

The flexure 17 is made of a conductive thin metal plate such as a resilient thin stainless steel rolled plate and has a thickness of about 20 μm. The flexure 17 is fixed to the load beam 13 by, for example, laser welding. The flexure 17 has an insulating layer on which a wiring pattern (not shown) is formed.

The flexure 17 has a slider mount 19. The slider mount 19 has a read/write terminal 19a. The terminal 19a is electrically connected to one end of the wiring pattern of the flexure 17. The other end of the wiring pattern of the flexure 17 extends toward the base plate 15.

The slider mount 19 supports the slider (not shown) that incorporates a transducer. The slider is arranged to face a track of the disk (not shown).

When the disk is turned at high speed, the slider slightly floats from the surface of the disk to form an air bearing between the disk and the slider, as is known in the art.

The load beam 13 will be explained in detail.

FIG. 2(1) is a plan view showing the load beam 13 in a half-finished state, FIG. 2(2) is a plan view showing the load beam 13 in a finished state, and FIG. 2(3) is a side view of FIG. 2(2). FIGS. 3(1), 3(2), and 3(3) are views showing a process of forming a dimple 25 with a metal mold on the load beam 13.

The load beam 13 has bent edges 27 extending in a longitudinal direction. A front end of the load beam 13 has an integral tab 21 used when loading/unloading the head suspension 11.

The tab 21 has a tongue shape protruding and extending from the front end of the load beam 13. The tab 21 has an inner concave curved surface and an outer convex curved surface. Between the tab 21 and the front end of the load beam 13, there is a slope 23. The slope 23 is slanted by a predetermined angle such that the slope 23 is gradually away from the disk toward the front end of the slope 23. The slope 23 is reinforced with the bent edges 27 extending along the load beam 13. The base of the tab 21 is supported and reinforced with the slope 23.

When loading/unloading the head suspension 11 onto or out of the disk in the hard disk drive, the tab 21 is guided along a guide or a ramp block (not shown) in the hard disk drive. The ramp block is made of synthetic resin and has a ramp guide surface. For example, when the disk is stopped from a rotating state, the tab 21 is moved onto the ramp block along which the tab 21 slides to retract through the ramp guide surface. With the ramp block, the slider of the head suspension 11 is guided into a retract zone defined at a side of the disk and is away from the disk.

The load beam 13 has the dimple 25 formed in a front end area of the load beam 13. The dimple 25 protrudes from a first (top, front) surface of the body of the load beam 13 and has an inner concave curved surface and an outer convex curved surface. The location of the dimple 25 on the load beam 13 corresponds to the location of the slider mount 19 of the flexure 17. The convex curved surface of the dimple 25 supports the slider so that the slider may roll and pitch.

The concave curved surface 25b of the dimple 25 is continuous to a second (bottom, back) surface of the body of the load beam 13. Namely, the concave curved surface 25b of the dimple 25 and the second surface of the load beam 13 is formed on a single continuous surface covering them. The dimple 25 has a modified (reformed) layer or part formed by irradiating a laser beam and extending from the concave curved surface 25b toward the inside thereof. The concave curved surface 25b is formed by carrying out plastic working on the modified part. The concave curved surface 25b is uniformly smooth and has lower surface roughness than the second surface of the load beam 13 on the same continuous surface.

Figure 8:
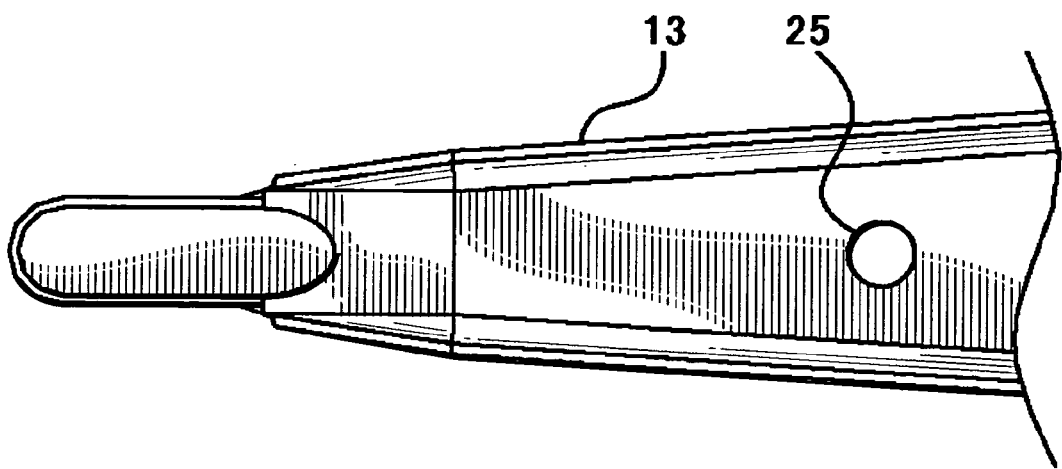
FIGS. 8(1) and 8(2) are back views showing a load beam before and after forming a mark thereon.
Figure 8:
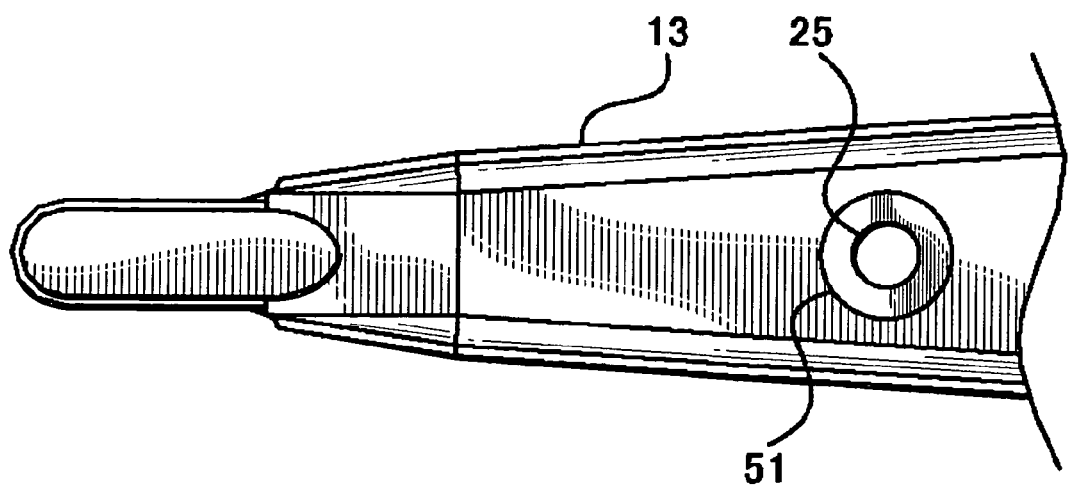

On the second surface of the body of the load beam 13, a mark 51 (FIG. 8(2)) is formed to provide positional information about a vertex 25c_out of the convex curved surface of the dimple 25.

The mark 51 is annular and is formed by, for example, laser marking. The mark 51 surrounds the dimple 25 (FIG. 8(2)). An origin (center) of the mark 51 coincides with the vertex 25c_out of the convex curved surface of the dimple 25. The mark 51 may take any form if it provides positional information about the vertex 25c_out of the convex curved surface of the dimple 25. The mark 51 may be formed by plastic working or etching.

According to the embodiment, before the slider is attached to the load beam 13, a bottom point of the concave curved surface 25b of the dimple 25 is extracted from the second surface side of the load beam 13. Based on the extracted bottom point, the slider is positioned onto the dimple 25 of the load beam 13.

For this, an image of the concave curved surface 25b of the dimple 25 is taken with an image pickup device such as a CCD camera, and from the image, positional information relating to the dimple 25 is obtained. To obtain the positional information from the image, image data processing is carried out with, for example, an image data processor. The image data processing binarizes the image and extracts the bottom point of the concave curved surface 25b of the dimple 25. At this time, the concave curved surface 25b of the dimple 25 has proper surface roughness and uniform smoothness as mentioned above. Accordingly, positional information about the bottom point of the concave curved surface 25b is precisely obtained.

According to the obtained positional information for the dimple 25, the slider is positioned and supported on the dimple 25. More precisely, a barycenter of the slider is adjusted to the dimple 25, and in this state, the slider is fixed to the slider mount 19 of the flexure 17 with, for example, an adhesive.

In this way, the embodiment takes an image of the concave curved surface 25b, which has proper surface roughness and uniform smoothness, of the dimple 25, obtains precise positional information for the dimple 25 from the image, and precisely positions a slider onto the dimple 25 according to the positional information.

As a result, the head suspension 11 having the load beam 13 can properly control the attitude of the slider.

Figure 6:
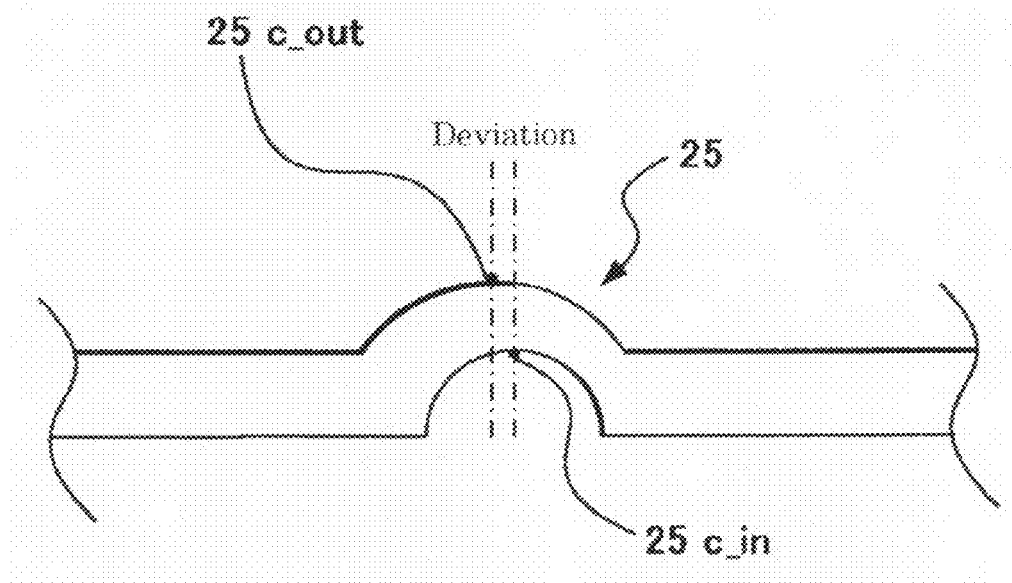
FIG. 6 is a view showing a dimple formed on a load beam according to an embodiment of the present invention.

In connection with the positioning of a slider onto a dimple, the inventor of the present invention has studied dimples having convex curved surfaces made by plastic working, in particular, press working using metal molds. The studies have found that dimples frequently cause a deviation between a vertex 25c_out of a convex curved surface and a bottom point 25c_in of a concave curved surface, as shown in FIG. 6. The deviation is caused by, for example, an error in arranging the metal mold and is in the range of several microns along the surface of the load beam.

If such a deviation occurs, the above-mentioned slider positioning technique that finds a bottom point on a concave curved surface of a dimple from the second (bottom, back) surface side of a load beam is unable to avoid a misalignment between the barycenter of a slider and the vertex 25c_out of the convex curved surface of the dimple. With such a misalignment, it is impossible to properly control the attitude of the slider.

To cope with this problem, the present invention forms the mark 51 on the second surface of the load beam 13, the mark 51 providing positional information about the vertex 25c_out of the convex curved surface of the dimple 25. By taking an image of the mark 51 with an image pickup device such as a CCD camera and by processing the image, precise positional information about the vertex 25c_out of the convex curved surface of the dimple 25 can easily and indirectly be obtained.

Even if there is a deviation between the vertex 25c_out of the convex curved surface of the dimple 25 and the bottom point 25c_in of the concave curved surface of the same, the positional information obtained from the mark 51 allows the barycenter of a slider to be precisely positioned onto the vertex 25c_out of the convex curved surface of the dimple 25. It is possible, therefore, to keep a required accuracy or more when positioning a slider onto a dimple.

Once the vertex 25c_out on the convex curved surface of the dimple 25 and the bottom point 25c_in on the concave curved surface of the dimple 25 are obtained, a deviation between the points 25c_out and 25c_in can easily and correctly be grasped from the second surface side of the load beam 13.

Based on the correctly grasped deviation, the barycenter of a slider can precisely be positioned on the vertex 25c_out of the convex curved surface of the dimple 25.

Next, a method of manufacturing the load beam 13 according to an embodiment of the present invention will be explained.

The method forms the dimple 25 on the load beam 13, and thereafter, forms the mark 51 that provides positional information about the vertex 25c_out of the convex curved surface of the dimple 25.

The dimple 25 is formed through a modifying (reforming) process and a dimple forming process carried out in order.

The modifying process prepares a flat plate as a work and irradiates a second (bottom, back) surface of a part of the work where the dimple 25 is formed with a laser beam, to form a modified (reformed) part at the irradiated part.

The flat plate work serves as the load beam 13 (FIG. 2(1)). In practice, the flat plate prepared as a work may contain a plurality of shaped or unshaped parts that are chained and are processed into load beams. Naturally, the flat plate prepared as a work may contain a single shaped or unshaped part to be processed into a load beam. The flat plate prepared as a work may be a metal sheet such as a stainless steel rolled sheet.

In FIG. 2(1), a hatched part 25a includes a part where the concave curved surface 25b (FIG. 2(3)) of the dimple 25 is formed and a peripheral area around the dimple 25. The part 25a is irradiated with a laser beam.

The laser beam rapidly heats or solidifies (melts) the part 25a to form a modified layer in the part 25a. Namely, the state of the partial surface of the work is modified before forming the dimple 25 on the work by press working (plastic working). At this time, a part of a first (top, front) surface of the work where the convex curved surface of the dimple 25 is formed and a peripheral area thereof may also be irradiated with a laser beam.

The reason why the parts irradiated with a laser beam includes the dimple 25 as well as the peripheral area thereof is to surely modify the part where the dimple 25 is formed. Laser beam irradiating conditions are determined according to the material of the work. Laser beam irradiating conditions must be determined properly according to the material of the work in order to properly melt and modify (reform) the partial surface of the work. An emitter for emitting a laser beam may be selected from a semiconductor laser, a YAG laser, a carbon dioxide laser, and the like.

On completion of the modifying process, the semifinished load beam has the modified part. Thereafter, the dimple forming process is carried out.

The dimple forming process carries out three-dimensional plastic working on the modified part that has been melted and softened with a laser beam, to form the dimple 25 having the inner concave curved surface and outer convex curved surface. At this time, at least the concave curved surface 25b is formed from the surface of the laser-irradiated part 25a that has been modified or reformed. The plastic working is, for example, cold forging and cold pressing using a metal mold, to produce the load beam 13 having the dimple 25.

The dimple forming process also forms the slope 23, the bent edges 27, and the like. If the work is not shaped into the load beam, cutting is carried out at the time of forming the dimple 25, to cut the work into the shape of the load beam. The cutting and the dimple forming can be carried out in a single step, to reduce the number of load beam manufacturing steps. This results in simplifying process management and reducing costs.

FIGS. 3(1) to 3(3) show a process of forming the dimple 25 with the use of a metal mold 49. The metal mold 49 includes a punch 43 and a stationary die 47. The punch 43 has a recess 41 that is smooth and has a semispherical shape. The die 47 has a protrusion 45 that is smooth and has a semispherical shape.

In FIG. 3(1), the semifinished load beam having the modified part is set at a predetermined position in the metal mold 49. The semifinished load beam in this case includes a flat plate prepared as a work that is a metal sheet such as a stainless steel rolled sheet. In addition, the semifinished load beam also includes a flat plate prepared as a work having a plurality of shaped parts that are chained or a single shaped part processed into load beams by, for example, etching. Each semifinished load beam is reformed or modified by irradiating a laser beam on the surface of the part 25a.

In FIG. 3(2), the punch 43 is descended onto the semifinished load beam set on the die 47 and is pressed to the semifinished load beam at a predetermined pressure. The load beam is pressed in a thickness direction, to form the dimple 25 (FIG. 3(3)) having a semicircular shape that is provided with the inner concave curved surface 25b and outer convex curved surface. At this time, the concave curved surface 25b of the dimple 25 has a dense fine metal structure and is smooth. Namely, the dimple 25 is provided with the concave curved surface 25b having proper surface roughness and uniform smoothness.

Images of second surfaces (concave curved surfaces) of dimples taken with a CCD camera (not shown) will be explained.

FIG. 4(1) is an image of the concave curved surface of a dimple formed according to a comparative example that carries out no laser beam irradiation. FIG. 4(2) is an image of the concave curved surface of a dimple formed according to the above-mentioned embodiment that carries out laser beam irradiation (fixed focus) and then forms the dimple at the laser-irradiated part. FIG. 5(1) is an image of the concave curved surface of a dimple formed according to the embodiment and FIG. 5(2) is an image of obtaining positional information about a bottom point extracted from the image of FIG. 5(1).

As is apparent from comparison between the images of FIGS. 4(1) and 4(2), a bottom point on the concave curved surface 25b of the dimple 25 according to the embodiment is remarkably brighter than that of the comparative example. In addition, a brightness difference between the bottom point and the periphery thereof according to the embodiment is more conspicuous than that of the comparative example. Also, a flat base area around the dimple 25 according to the embodiment is remarkably brighter than that of the comparative example.

Since the image of the bottom point on the concave curved surface 25b of the dimple 25 according to the embodiment is remarkably brighter than the periphery thereof, it is easy to binarize the image and extract the bottom point 25c_in from the image with accuracy, as shown in FIG. 5(2). Therefore, the positional information of the bottom point 25c_in can be easily and accurately obtained on the second surface side of the load beam 13.

A technique of forming the mark 51 according to an embodiment of the present invention will be explained.

Figure 7:
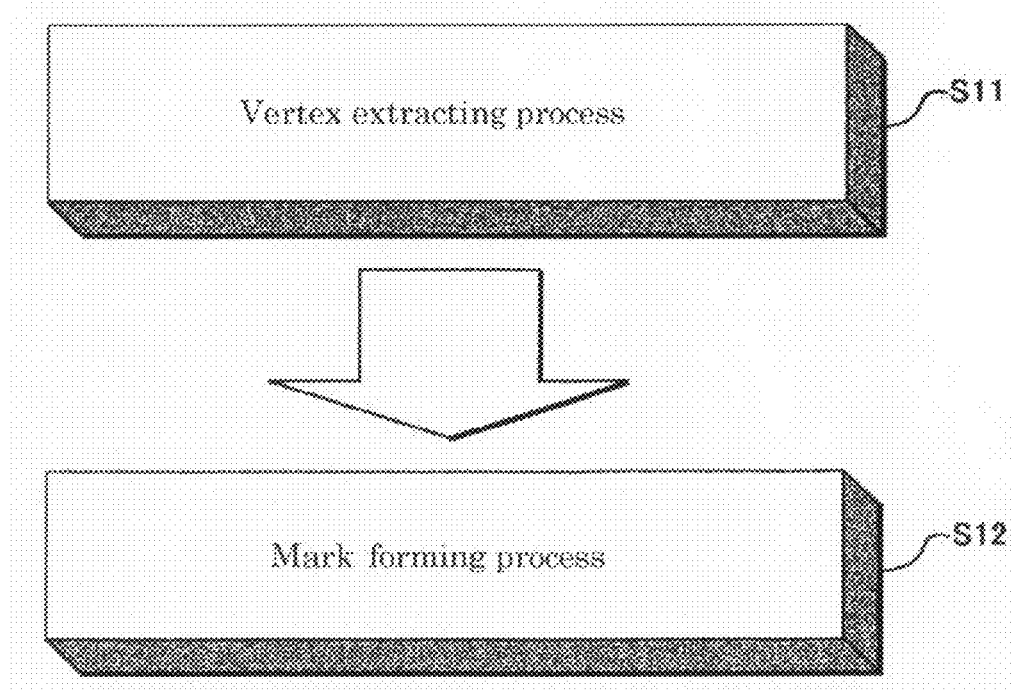
FIG. 7 is a view showing a method of manufacturing a load beam according to an embodiment of the present invention.

FIG. 6 is a view showing the dimple 25 formed on the load beam 13, FIG. 7 is a view showing a method of manufacturing the load beam 13, in particular, a technique of forming a mark on the load beam 13 according to an embodiment of the present invention, and FIGS. 8(1) and 8(2) are views showing the load beam 13 before and after forming the mark 51 on the load beam 13.

The mark 51 is formed through a vertex extracting process of step S11 and a mark forming process of step S12 shown in FIGS. 7, 8(1), and 8(2).

The vertex extracting process of step S11 extracts the vertex 25c_out of the convex curved surface of the dimple 25.

Extracting the vertex 25c_out is carried out with the use of, for example, a measuring apparatus disclosed in Japanese Unexamined Patent Application Publication No. 2006-308425 filed by the applicant of the present invention, the contents of which are incorporated herein by reference. This measuring apparatus has a simple structure and is capable of correctly measuring the length and position of an object. The measuring apparatus includes first and second parallel prisms, an optical lens, an image sensor, and a display unit.

In the measuring apparatus, the first parallel prism receives reflected light from a first spot of an object (the vertex 25c_out on the convex curved surface of the dimple 25) and the second parallel prism receives reflected light from a second spot of the object (the bottom point 25c_in on the concave curved surface of the dimple 25). Light from the first and second parallel prisms is converged or diverged by the optical lens. Light from the optical lens is received by the image sensor.

Based on the received light, the image sensor converts images of the first and second spots into electrical signals. Based on the electrical signals, the display unit displays images of the first and second spots in a single screen.

The measuring apparatus can take images from the vertex 25c_out of the convex curved surface of the dimple 25 and the bottom point 25c_in of the concave curved surface of the dimple 25, even if the points 25c_out and 25c_in are separated on the first and second surfaces of the load beam 13, respectively. On the display unit, the images of the points 25c_out and 25c_in are plotted on a common two-dimensional coordinate system and a point that agrees with the vertex 25c_out of the convex curved surface of the dimple 25 is found on the second surface of the load beam 13.

More precisely, the combined images of the points 25c_out and 25c_in are processed by, for example, bitmapping, to obtain positional information (two-dimensional coordinate data) about the points 25c_out and 25c_in on the common two-dimensional coordinate system and a positional relationship between the points 25c_out and 25c_in. Based on the obtained data, it is checked to see if there is a positional deviation between the points 25c_out and 25c_in.

The technique of extracting positional information regarding the vertex 25c_out of the convex curved surface and the bottom point 25_in of the concave curved surface of the dimple 25 is not limited to the above-mentioned technique. The present invention may adopt any technique to extract positional information about the vertex 25c_out of the outer convex curved surface and the bottom point 25_in of the inner concave curved surface of the dimple 25.

After the completion of the vertex extracting process of step S11, the mark forming process of step S12 is carried out.

The mark forming process of step S12 uses the positional information (two-dimensional coordinate data) relating to the vertex 25c_out to set an origin on the second surface of the load beam 13 and draw the annular mark 51 around the origin. The mark 51 is drawn with a laser beam (laser marking technique), to surround the dimple 25. The mark 51 may be formed not only by the laser marking technique but also by press working, etching, and the like.

As explained above, the load beam 13 according to the embodiment has the dimple 25 provided with the concave curved surface 25b that has proper surface roughness and uniform smoothness. The embodiment takes an image of the concave curved surface 25b from the second (bottom, back) surface side of the load beam 13, processes the image, and from the processed image, obtains precise positional information about the dimple 25. Based on the positional information, the embodiment precisely positions a slider on the dimple 25 when the positioning process is carried out from the second surface side of the load beam 13. Namely, the load beam 13 according to the embodiment improves the positioning accuracy of a slider.

The load beam 13 according to the embodiment has the mark 51 on the second surface thereof, the mark 51 providing positional information concerning the vertex 25c_out of the convex curved surface of the dimple 25. Even if there is a positional deviation between the vertex 25c_out of the convex curved surface of the dimple 25 and the bottom point 25c_in of the concave curved surface of the dimple 25, the position of the vertex 25c_out on the convex curved surface of the dimple 25 is correctly grasped by photographing an image of the mark 51 and processing the image.

Based on the correctly grasped position, the barycenter of a slider can precisely be positioned on the vertex 25c_out of the convex curved surface of the dimple 25. As a result, the positioning accuracy of the slider is maintained at a required level or over.

The load beam 13 according to the embodiment is produced by the method including the vertex extracting process of step S11 that extracts the vertex $25c$_out of the dimple 25 and the mark forming process of step S12 that forms, on the second surface of the load beam 13, the mark 51 representing positional information about the extracted vertex $25c$_out.

This method easily and surely manufactures the load beam 13 that allows the position of the vertex $25c$_out of the dimple 25 to be easily and precisely grasped.

Provided with the load beam 13 achieving the above-mentioned effects and the precisely positioned slider, the head suspension 11 can properly control the attitude of the slider.

Figure 9:
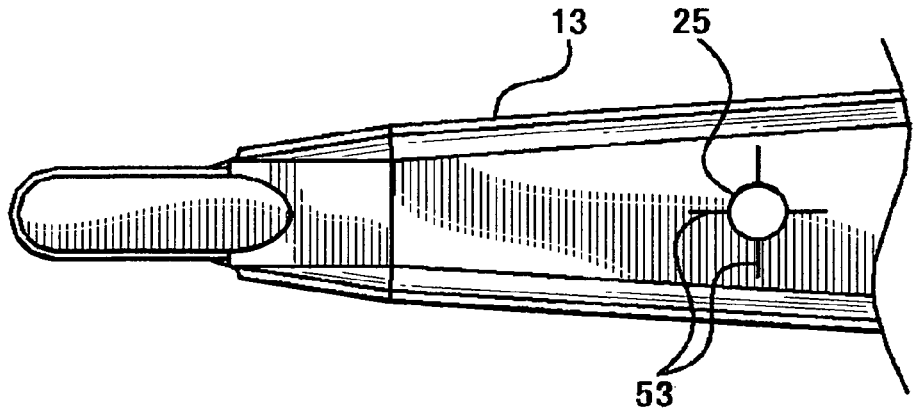
FIGS. 9(1) to 11 are views showing examples of marks formed on load beams according to embodiments of the present invention.
Figure 9:
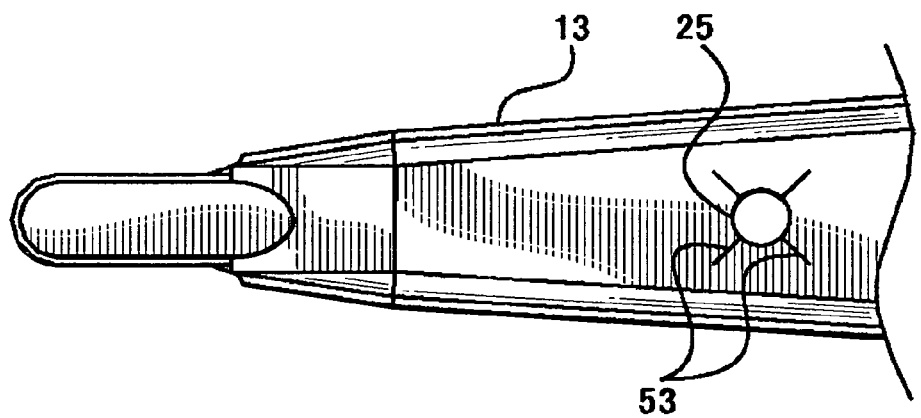
Figure 9:
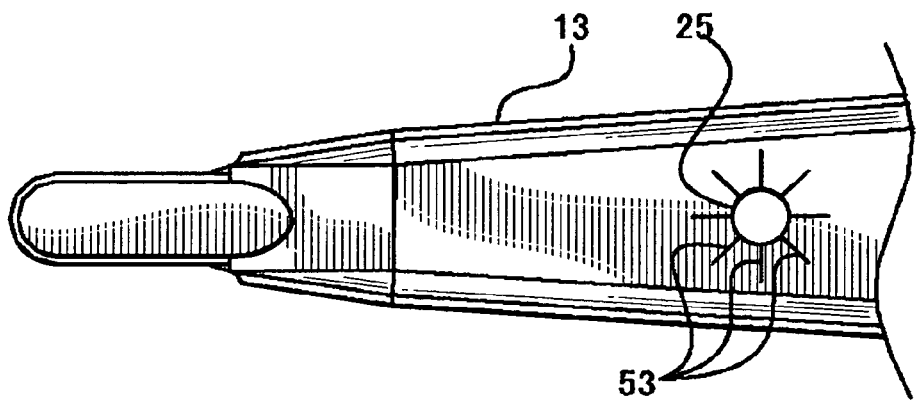

FIGS. 9(1) to 9(3) are views showing examples of marks formed on load beams according to embodiments of the present invention. In the following explanation, the same parts as those of the preceding embodiments are represented with the same marks and the explanations thereof are omitted.

In the example of FIG. 9(1), the load beam 13 has a mark 53 including four straight segments, instead of the annular mark 51 of the embodiment of FIG. 8(2).

The four straight segments of the mark 53 are arranged in a cross shape and are radially extended from the periphery of the dimple 25 with respect to an origin that agrees with a vertex $25c$_out of a convex curved surface of a dimple 25 formed on the load beam 13. The segments of the mark 53 are drawn from the dimple 25 on a second (bottom, back) surface of the load beam 13.

In the example of FIG. 9(2), the load beam 13 has a mark 53 that is formed by turning the mark 53 of FIG. 9(1) by 45 degrees. In the example of FIG. 9(3), the load beam 13 has a mark 53 that is a combination of the marks 53 of FIGS. 9(1) and 9(2).

Alternatively, the mark 53 may be formed from a single straight segment.

The mark 53 of any one of the examples shown in FIGS. 9(1) to 9(3) is photographed from the second surface side of the load beam 13 with an image pickup device such as a CCD camera, and the picked-up image is processed to easily and precisely obtain the exact position of the vertex $25c$_out of the convex curved surface of the dimple 25.

Figure 10:
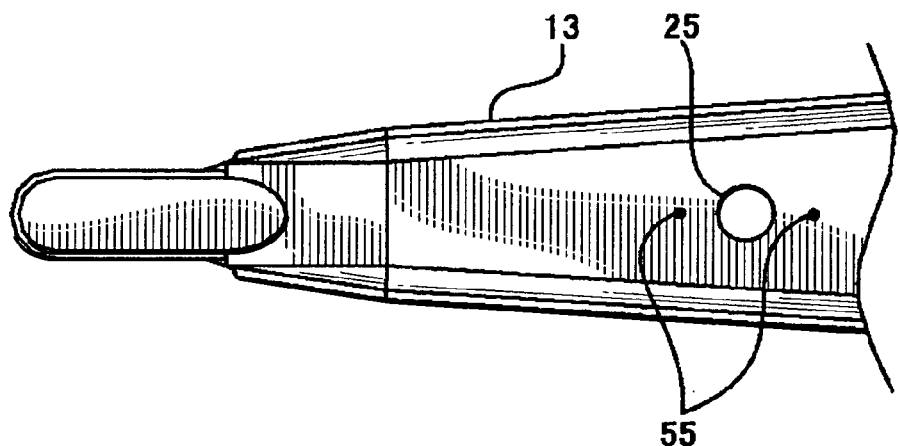
Figure 10:
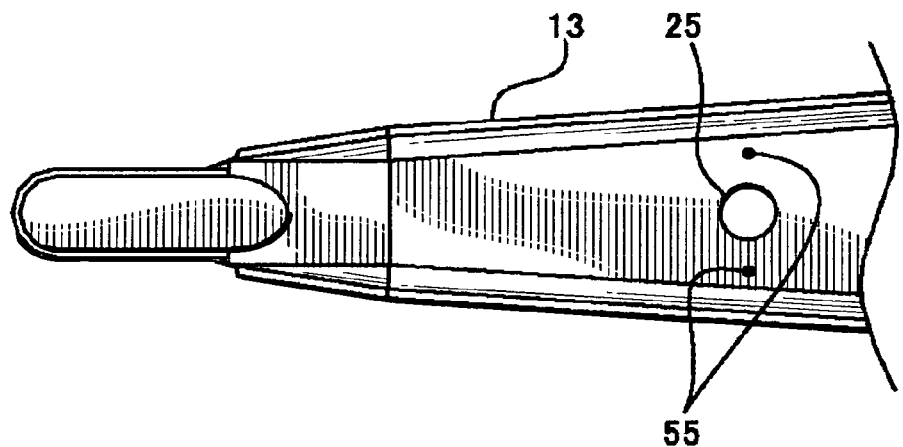
Figure 10:
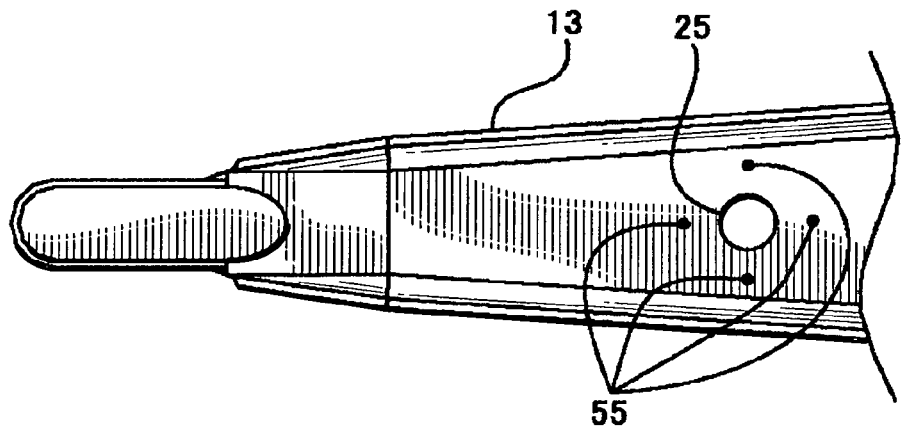

FIGS. 10(1) to 10(3) are views showing examples of marks formed on load beams according to embodiments of the present invention. In FIGS. 10(1) to 10(3), the same parts as those of the preceding embodiments are represented with the same marks and the explanations thereof are omitted.

In the example of FIG. 10(1), the load beam 13 has a mark 55 including a pair of dots, instead of the annular mark 51 of the embodiment of FIG. 8(2).

The pair of dots of the mark 55 are formed around an origin that agrees with a vertex $25c$_out of a convex curved surface of a dimple 25 formed on the load beam 13. The dots are symmetrically arranged on a second (bottom, back) surface of the load beam 13 around the dimple 25.

In the example of FIG. 10(2), the load beam 13 has a mark 55 that is formed by turning the mark 55 of FIG. 10(1) by 90 degrees. In the example of FIG. 10(3), the load beam 13 has a mark 55 that is a combination of the marks 55 of FIGS. 10(1) and 10(2).

The mark 55 of any one of the examples shown in FIGS. 10(1) to 10(3) is photographed from the second surface side of the load beam 13 with an image pickup device such as a CCD camera, and the picked-up image is processed to easily and precisely obtain the exact position of the vertex $25c$_out of the convex curved surface of the dimple 25.

Figure 11:
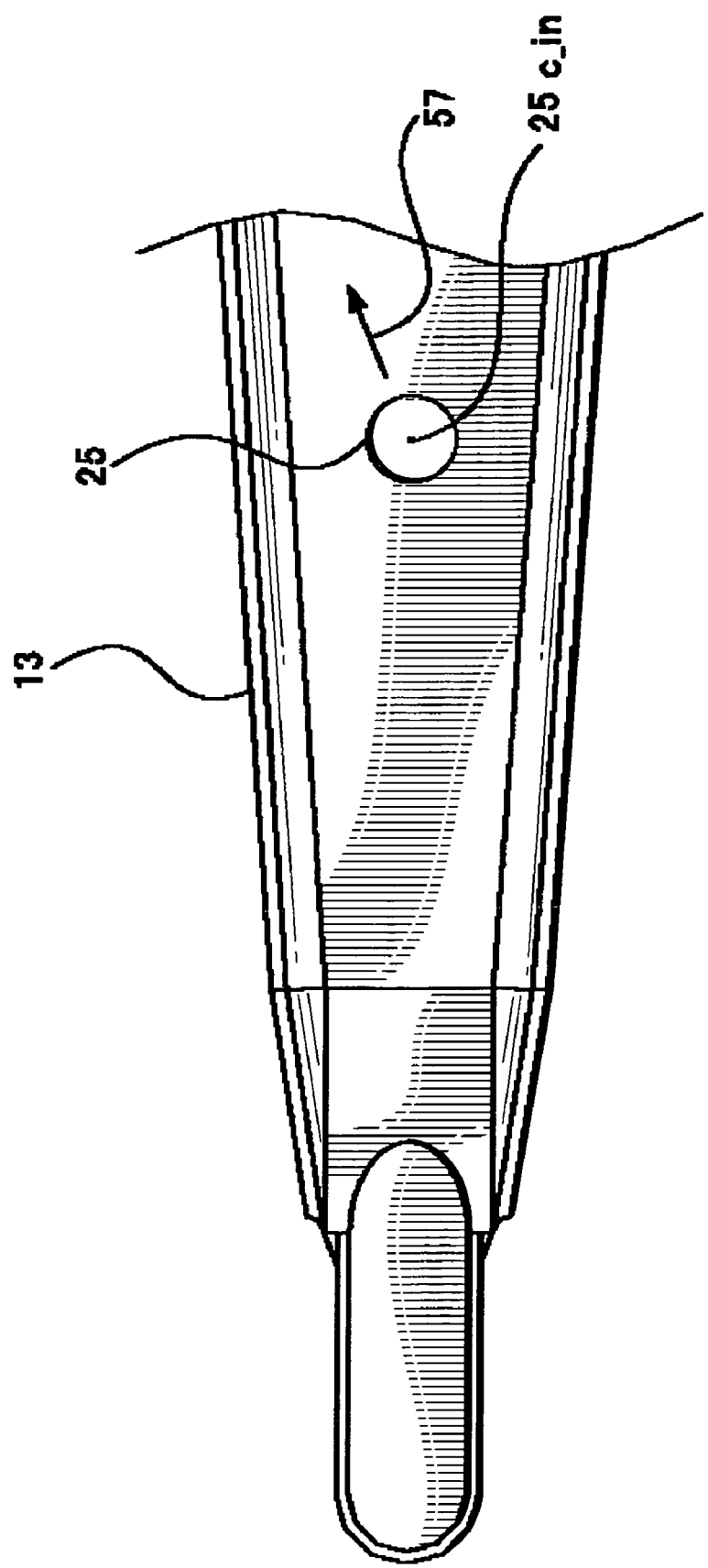

FIG. 11 is a view showing an example of a mark formed on a load beam according to an embodiment of the present invention. In FIG. 11, the same parts as those of the preceding embodiments are represented with the same marks and the explanations thereof are omitted.

In the example of FIG. 11, the load beam 13 has a mark 57 that is a vector locus, instead of the annular mark 51 of the embodiment of FIG. 8(2).

The length of the vector locus of the mark 57 represents the amount of a deviation of a vertex $25c$_out of a convex curved surface of a dimple 25 formed on the load beam 13 from a bottom point $25c$_in of a concave curved surface of the dimple 25. The orientation of the vector locus of the mark 57 represents the orientation of the deviation. An actual amount of the deviation is usually vary small, in the order of microns. Accordingly, when drawing the mark 57 on a second (bottom, back) surface of the load beam 13, the mark 57 may be enlarged by an optional magnification of, for example, about 100 so that the mark 57 becomes easy to recognize.

The deviation of the vertex $25c$_out of the convex curved surface of the dimple 25 from the bottom point $25c$_in of the concave curved surface of the dimple 25 and the orientation of the deviation are obtained through image processing, like the above-mentioned embodiments.

Namely, images of the vertex $25c$_out on the convex curved surface of the dimple 25 and the bottom point $25c$_in on the concave curved surface of the dimple 25 are taken by an image sensor and the images are plotted on a common two-dimensional coordinate system. The images on the coordinate system are processed by, for example, bitmapping to obtain positional information (two-dimensional coordinate data) about the points $25c$_out and $25c$_in on the common two-dimensional coordinate system. Based on the positional information, the above-mentioned deviation and orientation are found.

In this way, using the bottom point $25c$_in on the concave curved surface of the dimple 25 as an origin based on the precise positional information, the example of FIG. 11 forms the vector locus 57, so that the vector locus 57, i.e., the mark 57 may indicate the deviation and orientation of the vertex $25c$_out of the convex curved surface of the dimple 25 relative to the bottom point $25c$_in of the concave curved surface of the dimple 25. Due to this, the position of the vertex $25c$_out on the convex curved surface of the dimple 25 is extremely precisely grasped.

The present invention is not limited to the embodiments mentioned above. Without departing from the scope and spirit of the present invention stipulated in the specification and appended claims, the present invention allows a variety of modifications. It should be understood that the present invention covers head suspensions, load beams, and load beam manufacturing methods that occur from such modifications.

For example, a method of manufacturing a load beam according to a modification of the present invention may include a process of determining whether or not a deviation exists between a vertex $25c$_out on a convex curved surface of a dimple 25 and a bottom point $25c$_in on a concave curved surface of the dimple 25. This modification obtains a positional relationship between the points $25c$_out and $25c$_in as mentioned above, and according to the obtained positional relationship, determines whether or not there is a deviation between the points $25c$_out and $25c$_in. A result of the determination may be depicted on the load beam, or if there is no deviation, no mark may be drawn on the load beam.

According to another modification of the present invention, a load beam may be manufactured without modifying (reforming) any surface of the load beam.

What is claimed is:

1. A load beam having a body and a dimple, the body being made of a plate having a first surface and a second surface each being positioned opposite one another, the dimple having a convex curved surface protruding from the first surface of the body and supporting a slider so that the slider is movable in predetermined directions to write and read information to and from a disk in a disk drive, the load beam comprising:
   a flexure having a slider mount and being fixed to the first surface of the body, the slider mount having a first surface on which the slider is mounted and an opposing second surface facing the first surface of the body and contacting the dimple so as to be supported by the dimple; and
   a mark formed on the second surface of the body, configured to provide positional information about a vertex of the dimple.

2. A head suspension comprising the load beam of claim 1.

3. A method of manufacturing the load beam of claim 1, comprising:
   obtaining the positional information about the vertex of the dimple; and
   forming the mark on the second surface of the body of the load beam, so that the mark provides the positional information about the vertex.

4. The method of claim 3, wherein:
   forming the mark on the second surface of the body of the load beam employs a laser beam to form the mark.

5. The load beam of claim 1, further comprising:
   a concave curved surface formed opposite to the convex curved surface of the dimple and continuous to the second surface of said body; and
   the mark representing an amount of a deviation of the vertex of the convex curved surface from a bottom point of the concave curved surface of the dimple.

6. The load beam of claim 5, further comprising:
   a modified layer formed as a surface layer of the concave curved surface and having a lower surface roughness than the second surface of said body excluding the modified layer.

* * * * *